United States Patent [19]

Ellion et al.

[11] 4,305,247

[45] Dec. 15, 1981

[54] ELECTROTHERMALLY AUGMENTED HYDRAZINE THRUSTER

[75] Inventors: M. Edmund Ellion, Arcadia; Preston S. DuPont, Northridge; Robert A. Meese, Torrance, all of Calif.

[73] Assignee: Hughes Aircraft Company

[21] Appl. No.: 49,997

[22] Filed: Jun. 18, 1979

[51] Int. Cl.³ .............................................. F02K 00/00
[52] U.S. Cl. .................................. 60/200 R; 60/203.1
[58] Field of Search ............ 60/200 R, 203, 39.46 M; 219/368, 374, 375

[56] References Cited

U.S. PATENT DOCUMENTS

| | | | |
|---|---|---|---|
| 2,438,865 | 3/1948 | Rehard | 219/368 |
| 3,635,824 | 1/1972 | Brandes et al. | 219/374 |
| 3,807,657 | 4/1974 | Brill | 60/200 R |

FOREIGN PATENT DOCUMENTS

| | | | |
|---|---|---|---|
| 2535520 | 7/1976 | Fed. Rep. of Germany | 60/203 |
| 210281 | 3/1968 | U.S.S.R. | 219/374 |

Primary Examiner—Robert E. Garrett
Attorney, Agent, or Firm—Allen A. Dicke, Jr.; W. H. MacAllister

[57] ABSTRACT

Specific impulse of hydrazine thruster is augmented by electrothermally heating the hot gas in heater passages 36 and 37 as it passes from hydrazine dissociation chamber 14 to thrust nozzle 28. Tubular ceramic electric resistance heater 31 performs primary heating. Specific impulse can be raised from 230 to 300 seconds.

5 Claims, 2 Drawing Figures

ELECTROTHERMALLY AUGMENTED HYDRAZINE THRUSTER

BACKGROUND

This invention is directed to a hydrazine thruster which has augumented specific impulse by heating of the gases which are the product of hydrazine dissociation.

Various space vehicles require thrust for propulsion, stabilization, station keeping, orbit changing, course correction, and even soft landing. One system for providing such thrust includes the dissociation of hydrazine. Liquid hydrazine is carried on the spacecraft and when thrust is desired, a portion of the liquid hydrazine is fed through a dissociation catalyst and the resultant hot gases are discharged out of a nozzle to produce thrust. Such devices are seen in M. E. Ellion and D. A. Mahaffy U.S. Pat. No. 3,871,828 and in M. E. Ellion and P. A. Donatelli U.S. Pat. No. 4,069,664. These disclose well-developed and highly reliable thrusters which are capable of delivering a steady state specific impulse of approximately 230 seconds. The temperature at the thrust nozzle inlet in such a thruster is about 1500° F. To improve the specific impulse, thrust nozzle inlet temperature must be raised.

SUMMARY

In order to aid in the understanding of this invention, it can be stated in essentially summary form that it is directed to an electrothermally augumented hydrazine thruster wherein the decomposition products of hydrazine dissociation are heated by a ceramic heater to increase the thrust nozzle gas temperature.

It is thus an object of this invention to provide a thruster wherein post heating of the hydrazine dissociation products is accomplished to increase the thrust nozzle gas inlet temperature. It is another object to employ a ceramic heater which is electrically powered and and along which the hydrazine dissociation products flow. It is a further object to provide an electrothermally augumented hydrazine thruster which employs a ceramic heater therein to improve specific impulse.

Other objects and advantages of this invention will become apparent from a study of the following portion of this specification, the claims and the attached drawings.

DESCRIPTION OF THE PREFERRED EMBODIMENT

Figure 2:
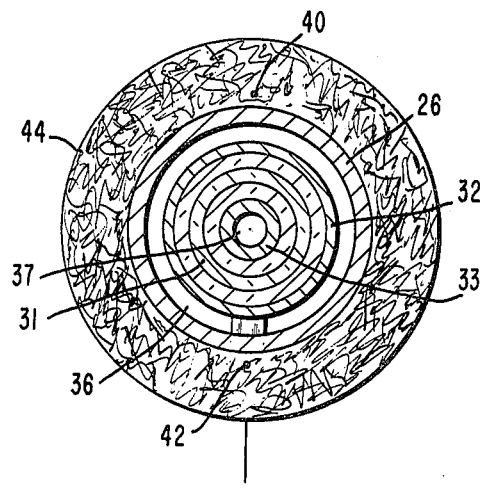
FIG. 2 is a section taken generally along line 2—2 of FIG. 1.
Figure 1:
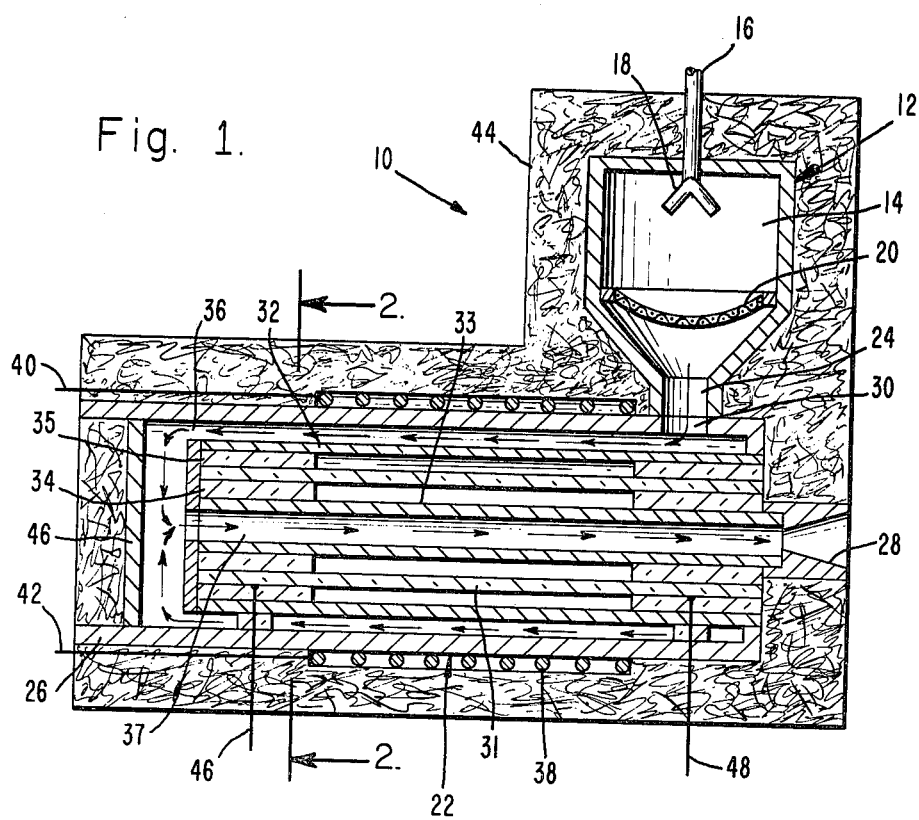
FIG. 1 is a longitudinal section through a preferred embodiment of the electrothermally augumented hydrazine thruster of this invention.

The electrothermally augumented hydrazine thruster of this invention is generally indicated at 10 in FIG. 1. Hydrazine gas generator 12 has a chamber 14 into which liquid hydrazine is admitted through inlet tube 16 and injector 18. Screen 20 closes the outlet of chamber 14. Chamber 14 is filled with a liquid hydrazine dissociation catalyst, for example, "Shell 405" catalyst manufactured by the Shell Oil Co.

The preferred embodiment of gas generator 12 is that disclosed in the M. E. Ellion and P. A. Donatelli, U.S. Pat. No. 4,069,664. A second preferred embodiment is shown in M. E. Ellion and D. A. Mahaffy, U.S. Pat. No. 3,871,828. Those structures are preferred because they each have advantages, as defined in the respective patents, as compared to the more elementary type structures. Furthermore, other improved hydrazine gas generator structures can be employed.

Hot hydrazine gas is delivered from gas generator 12 to electrothermal heater 22 through hot gas passage 24. Heater sleeve 26 is of a high temperature capability refractory metal. It has nozzle 28 formed at the outlet end thereof. Inlet opening 30 to heater 22 receives the hot gas from generator 12. Preheater 38 is a coil wrapped around the exterior of the main heater sleeve 26 and used to raise the main heater temperature to the point wherein the main ceramic heater can operate with a moderate applied voltage. Preheater 38 is electrically powered, as through leads 40 and 42. Thermal insulation 24 surrounds hot gas generator 12 and electrothermo heater 22.

As seen in FIG. 1, heater tube 31 is enclosed between outer sleeve 32 and inner sleeve 33. Sleeves 32 and 33 are of high temperature resisting metal, and heater tube 31 is a high temperature electrically conducting ceramic tube having sufficient resistivity to provide a low electrical resistance heater.

Leads 46 and 48 provide the necessary electrical connection to the heater tube 31. The leads pass through appropriate insulating openings through the metal parts and through protective stand-offs in the gas passage 36. The leads 46 and 48 are bonded to the heater tube 31 by means of a high temperature conductive ceramic adhesive. The ceramic main heater is constructed of a molded zirconia tube with platinum leads bonded near the ends. The heater material may be stabilized with other materials such as yttrium to provide an extended operating life. Separator rings 34 and 35, respectively interiorly and exteriorly of heater tube 31 space the inner and outer sleeves from the heater tube. Many refractory ceramic materials are electrical insulators at low temperatures but the resistance drops with very high temperatures until it is lowered sufficiently to be electrically powered as a heater. This resistance characteristic is used to measure heater temperature by determining current flow. This resistance characteristic can be altered by the ceramic formulation when manufactured and be the design—i.e., control of the cross sectional areas. Preheater 38 is operated until the heater 31 is hot enough (up to about 2000° F.) to be in its normal conductive range. Heater tube 31 radiantly and conductively heats the inner and outer sleeves. The gas passing through outer gas passage 36 and thence through inner gas passage 37 is in conductive and radiant relationship to the heated sleeves. In this way, the flowing gas is further heated. The heated gas expands out of nozzle 28 to produce thrust.

In view of the high temperatures reached, the materials of the sleeves, separator rings and heaters must be carefully chosen. Separator rings 34 and 35 are made of thermal insulating material, such as zirconium oxide. Heater tube 31 is made of electrically conducting stabilized zirconium oxide ceramic. The metallic members, including sleeves 32 and 33 as well as sleeve 26 and its end cap 46 together with nozzle 28 are made out of high temperature metal, such as rhenium or an alloy of 75% tungsten-25% rhenium.

The gas temperature at nozzle 28 reaches about 3600° F. to produce a specific impulse of 300 seconds. Heater power to produce this increase in gas temperature is less than about 5 watts per millipound of thrust. In this way, improved specific impulse is achieved. The electrothermal augumentation of the specific impulse provides a system in which thrust is achieved even with electrical failure, but without the augumentation provided. Thus, should the electrical heater system fail, the hot gas dissociation products are expanded out of nozzle 28 in the present day manner without thermal augumentation.

This invention has been described in its preferred embodiment and it is clear that it is susceptible to numerous modifications and embodiments within the ability of those skilled in the art and without the exercise of the inventive faculty. Accordingly, the scope of this invention is defined by the scope of the following claims.

We claim:

1. A thermally augumented hydrazine thruster comprising:
   chamber means for containing hydrazine decomposition catalyst and a hydrazine injector for injecting hydrazine into said chamber means so that the hydrazine is dissociated to hot gas, a hot gas outlet from said chamber means;
   walls defining a heater passage, said heater passage being connected to said hot gas outlet so that said heater passage receives hydrazine dissociation products in the form of hot gas from said hot gas outlet;
   an electrically resistive tubular ceramic resistance heater positioned for heating gas in said heater chamber;
   an exterior protector tube positioned around the exterior of said tubular ceramic resistance heater and an interior protector tube positioned within said tubular ceramic resistance heater, said protector tubes being heated by said tubular ceramic resistance heater to prevent hot gas from the decomposition chamber from flowing directly against said tubular ceramic resistance heater, said protector tubes being positioned so that hot gas flows both exteriorly and interiorly thereof.

2. The thruster of claim 1 wherein said nozzle is positioned to receive hot gas flowing from the interior protector tube.

3. A thermally augumented hydrazine thruster comprising:
   chamber means for containing hydrazine decomposition catalyst and a hydrazine injector for injecting hydrazine into said chamber means so that the hydrazine is dissociated to hot gas, a hot gas outlet from said chamber means;
   walls defining a heater passage, a preheater positioned around the exterior of said heater passage walls, said heater passage being connected to said hot gas outlet so that said heater passage receives hydrazine dissociation products in the form of hot gas from said hot gas outlet, an electrically resistive tubular ceramic resistance heater positioned within the passage defined by said walls for heating gas in said heater passage; and
   an exterior protector tube positioned around the exterior of said tubular ceramic resistance heater and an interior protector tube positioned within said tubular ceramic resistance heater, said protector tubes being heated by said tubular ceramic resistance heater and protecting said tubular ceramic resistance heater to prevent hot gas from the decomposition chamber from flowing directly against the tubular ceramic resistance heater.

4. The thruster of claim 3 where both said pre-heater and said tubular ceramic resistance heater are electrically energized.

5. The thruster of claim 3 wherein said nozzle is positioned to receive gas passing through the interior of said tubular ceramic resistance heater.

* * * * *